United States Patent [19]

Penny

[11] Patent Number: 5,096,080
[45] Date of Patent: Mar. 17, 1992

[54] STORAGE BIN

[76] Inventor: David J. Penny, 84 Woodborough Road, Guelph, Ontario, Canada, N1G 3K5

[21] Appl. No.: 623,037

[22] Filed: Dec. 6, 1990

[30] Foreign Application Priority Data

Dec. 6, 1989 [CA] Canada ................................ 2004732

[51] Int. Cl.$^5$ ................................................ C05F 9/02
[52] U.S. Cl. ................................ 220/4.09; 220/4.16; 220/4.34; 220/908; 71/14
[58] Field of Search ................ 71/14; 220/4.09, 4.16, 220/4.08, 4.04, 4.34, 4.33, 4.28, 484, 493, 489, 908, 913, 375

[56] References Cited

U.S. PATENT DOCUMENTS

| 204,611 | 6/1878 | Richards | 220/4.28 |
| 556,056 | 3/1896 | Heath | 220/4.28 |
| 777,873 | 12/1904 | Weeks | 220/4.09 |
| 871,817 | 11/1907 | Parker | 220/4.09 |
| 1,125,822 | 1/1915 | Dodds | 220/4.09 |
| 1,336,358 | 4/1920 | Knapp et al. | 220/4.09 |
| 1,464,801 | 8/1923 | Beers | 220/493 |
| 1,531,488 | 3/1925 | McNamara | 220/4.09 |
| 1,895,428 | 1/1933 | Edgin | 220/4.28 |
| 1,933,838 | 11/1933 | Ashe | 220/4.09 |
| 3,980,202 | 9/1976 | Monyak et al. | 220/375 |
| 4,105,412 | 8/1978 | Petzinger | 220/908 |
| 4,108,609 | 8/1978 | Petzinger | 220/908 |
| 4,211,033 | 7/1980 | Ringer | 220/4.16 |
| 4,974,744 | 12/1990 | Shanklin et al. | 220/375 |

FOREIGN PATENT DOCUMENTS

| 497784 | 5/1930 | Fed. Rep. of Germany | 220/4.09 |
| 659357 | 6/1929 | France | 220/4.16 |

Primary Examiner—Stephen Marcus
Assistant Examiner—S. Castellano
Attorney, Agent, or Firm—Donald E. Hewson

[57] ABSTRACT

A storage bin suitable for use as a compost bin is disclosed. Such a storage bin is prefabricated and is made to be easy to assemble and disassemble, without the use of tools. Furthermore, the unassembled storage bin provides its own container for storing the bin itself or for transporting the bin. As a compost bin, as inexpensive, lightweight, weather resistant, aesthetically pleasing unit, that will provide a good composting environment, is provided.

18 Claims, 3 Drawing Sheets

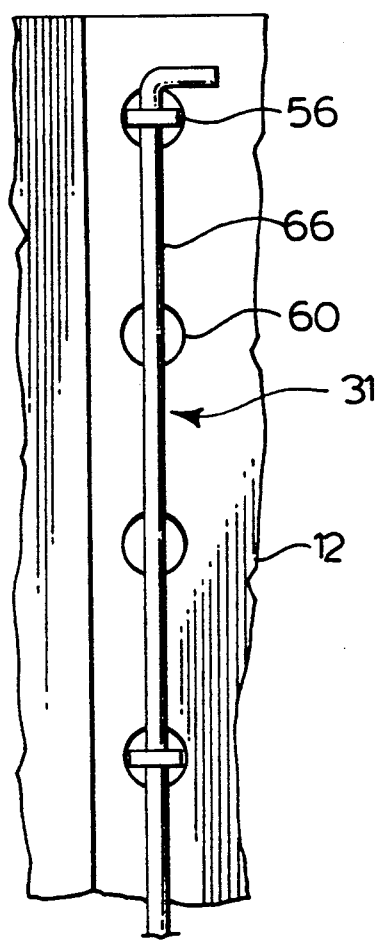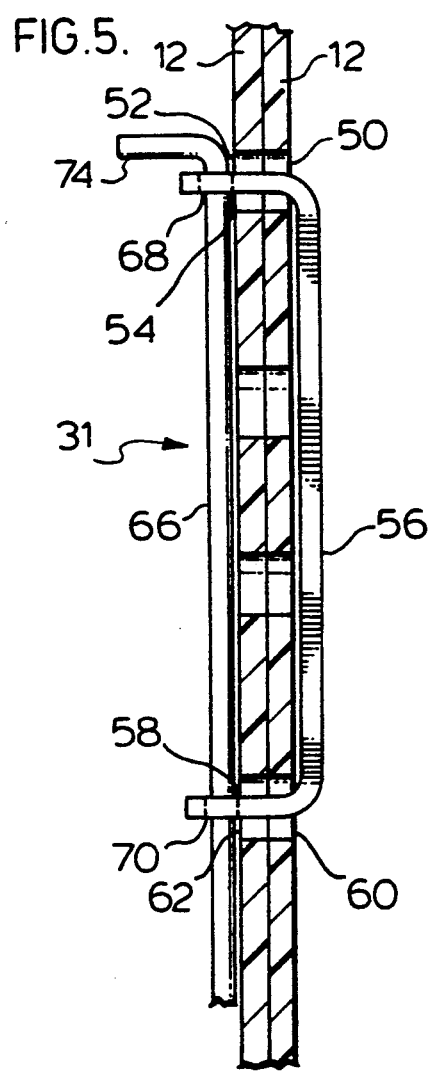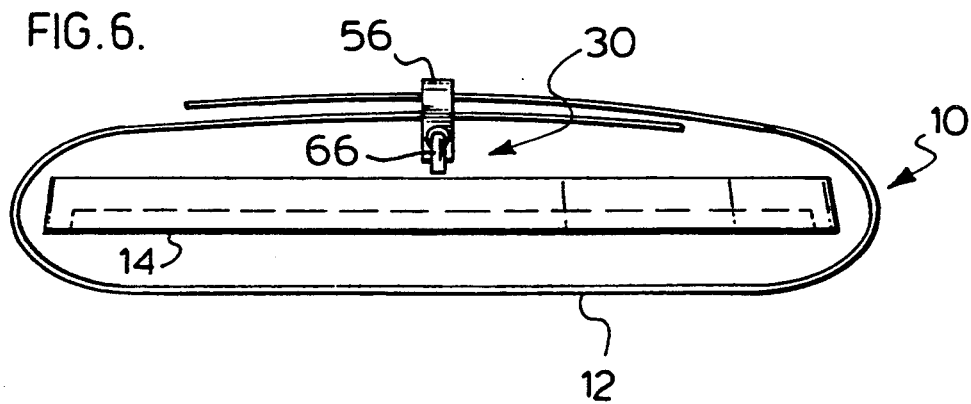

STORAGE BIN

FIELD OF THE INVENTION

This invention relates to storage bins adapted to receive and retain refuse, and suitable for use in an outdoor environment, and more particularly to storage bins for receiving, retaining and developing compost.

BACKGROUND OF THE INVENTION

Dealing with waste material produced in ordinary household living has long been a problem, which has been dealt with in a variety of ways. Probably the most simple way to deal with household waste, or at least a very high percentage of it, is to contain all of the waste in one container. Periodically, the waste in the container is removed and relocated to either a larger container or to a waste storage site. In modern society, most residences have a service provided whereby refuse is regularly removed to some sort of waste storage site such as a land fill site or the like. Given that waste is accumulating at a tremendous, and even unbelievable rate, it is well documented that problems exist in terms of the size and number of garbage dumps and land fill sites that are required by modern society. Furthermore, the cost of collecting such amounts of garbage is enormously high.

In such a system as described above, whereby all household waste material is contained together, then there indeed would be a number of very different types of waste all combined together. Such types of waste would include organic food waste, both animal and vegetable, inorganic food waste, paper products, metals, glass, plastics, yard wastes, which are typically organic and also a small percentage of other wastes.

Combining all such wastes together and storing in some sort of storage location, such as a garbage site or land fill site, can create problems. One such problem is that enormous amounts of waste are collected in whatever type of waste storage site, and are neither re-used or re-cycled, thus producing very large waste storage sites containing vast amounts of waste. It is estimated that in North American society, for every one million people about five hundred thousand metric tonnes of waste is produced every year, and with present methods of waste disposal, very little of this is re-used.

Another problem is that in order for any of this waste to be re-used, it would need to be sorted. Given that it has already been combined together, such sorting is very difficult, time consuming, expensive, messy, and generally undesirable. Obviously, it is necessary that waste be sorted as it is produced, if it is to be re-used.

Still another problem exists with throwing away refuse, in that once something is disposed of into a garbage dump or a land fill site, it most likely will never be used again. More material must be used to replace whatever is thrown away. This means that whatever is being produced is being drawn from a supply of new material that is ultimately not being fully replenished. Unfortunately, supplies of all materials are limited, even if they are vast. While this is not quite as true for organic materials as it is for some other types of materials, it is still highly advantageous to conserve organic material for composting rather than contain it in waste storage sites. The fertilizing materials and minerals found in the compost must be replaced from another source if they are not re-introduced back into the soil through composing. Supplies of fertilizer such as peat moss or synthetic fertilizer are not unlimited, however. It is also preferable to introduce natural types of soil nutrients into the ground rather than a synthetic product.

In order to reduce the amount of waste produced by modern society it is possible to both recycle and to compost. Recycling applies to industrial materials such as paper, metals, glass, plastics, and so on. Composting applies more particularly to organic food waste and organic yard waste. It can be done very easily on a household by household basis. In order to compost, organic material, such as food waste and yard trimmings, are simply kept in a pile where the material can remain somewhat moist. It is also possible to add already composted material in order to get the composting process started more quickly. More organic material is added on an ongoing basis and is mixed in with the material already there. It is preferable that the pile be about one cubic meter in volume, but the process certainly will work as the compost pile is built up to this size. Materials such as fruits, vegetables, egg shells, grains, grass clippings, leaves, and plant remains are all suitable for composting. It is important to use some materials with a high carbon content such as leaves and materials with a high nitrogen content such as kitchen scraps and grass clippings. Composting is merely the method by which organic wastes are broken down through self sustaining catalytic exothermic reactions. The organic matter used in the composting process is returned to the soil in a form that is usable by other plants and promote plant growth. Introduction of properly composted material to soil helps make the soil rich and organic, and much more suitable for growing plants.

For proper composting it is necessary that the organic material be collected together in a damp but not overly wet environment. It is also necessary that a certain amount of air flow past and even through the mass of organic waste, since oxygen is required for the biological processes and the decomposition. The material must however be heaped together such that not enough air reaches it to dry out the material, or cool it down too much or too quickly. If there is not enough oxygen, then the composting process becomes an anaerobic one. Such an anaerobic process produces and utilizes a different kind of bacteria, which are malodorous. Furthermore, the process does not produce true compost.

It is also necessary that the material be mixed around so that all the material be exposed to the composting process. Such mixing allows material that may not be composting quickly or not very far along in the composting process to be mixed with material that is already fairly well composted. Such mixing will help catalyze the less developed composting process. Typically, this is quite helpful in getting material that has been newly introduced into a composting pile to get started more quickly in the composting process. Another advantage of composting is that a large percentage of household waste, estimated at between one third and one half, can be composted. Elimination of such a large percentage of household waste to be thrown out, reduces the cost of moving and relocating waste and also reduces the amount of waste in garbage dumps and land fill sites.

DESCRIPTION OF THE PRIOR ART

The most primitive form of providing means for composting is to simply pile the appropriate waste on the ground and mix the waste around such that proper composting can take place. This has several disadvantages, such that it is not protected from either animals or the environment, it looks unsightly, and it might not pile up properly, as is necessary for composting, but instead could tend to spread out too much.

Another fairly well known method is to take a length of snow fence and place it such that it forms a circle of about 3 ft. diameter. It is necessary to secure the fence in one or two places by driving the stakes into the ground and then tying stakes to parts of the fence, or some sort of similar arrangement. This arrangement is fairly inexpensive, it allows for proper aeration, and allows for access for turning the compost. However, the structure is not overly sturdy and also is not very aesthetically pleasing. It is does not fabsorb very much solar energy, which is useful to keep the composting reaction relatively warm. It is also not very weatherproof, which is necessary for keeping excessive moisture out.

Another popular way is to make a composting frame out of lengths of wood and then staple or generally fasten fencing or chicken wire on the inside. The generally accepted ideal size is about one cubic meter or a bit less. Problems similar to those encountered with a snow fence arrangement are also encountered with this arrangement, except that a frame made from wood can be quite sturdy.

There are also composters available that are prefabricated, such as wire compost bins. Such bins are typically made from four wire posts that are embedded into the ground with fencing spanning therebetween. Again, the problems encountered with prefabricated wire compost bins are virtually the same as those encountered with a snow fence compost bin. One advantage with a prefabricated wire compost bin is that it takes very little time to set up or take down.

One type of compost bin that is more modern and overcomes some problems associated with more primitive types of compost bins is a tumbler type of bin, such as a Green Magic Tumbler (Trade Mark). The Green Magic Tumbler comprises a plastic barrel that is mounted rotatably on a metal frame. The tumbler has a lid secured on the top and a number of vent holes for aeration. In order to mix the compost, the barrel is simply turned over as desired. Due to the relatively small size of the lid, it is difficult to turn the compost using a pitchfork, compost aerating tool, or whatever. Use of such devices to turn the compost provides for much better mixing of the material being composted. This tumbler also has other problems associated with it as it is expensive and it does not hold as much compost as most other compost bins.

The SoilSaver (Trade Mark) composter is a prefabricated composter that is substantially cubic in shape, and appears to be made of a series of boards, but is actually made from plastic. The disadvantages of this unit include that it is difficult to turn and difficult to empty (the door at the bottom is small), and it does not hold very much material.

The Ecolyzer (Trade Mark) is a type of composter that provides a slightly different approach than most other composters in that it is dug into the ground instead of sitting on the ground. A basket is inserted into the hole, and compostable waste materials are inserted therein and a chemical mixture is added to aid the composting process. A top section is then placed over the basket containing the waste material to protect the material from the environment and also to provide heat insulation. The disadvantages of this system include that it uses chemicals, a sizable hole must be dug, the amount of compost is fairly small, and the process is subtantially anaerobic in nature, which does not produce proper compost. It also may tend to be malodorous.

Canadian Patent 986,896 to Jerpbak discloses a plastic container to be used in conjuction with large plastic garbage bags. The device is used to hold the garbage bag open so that it may be filled, and is moved upwardly along the garbage bag as the garbage bag becomes filled. The device does not form the entire supporting structure and is not contemplated for use without a garbage bag. Furthermore, use in composting is not contemplated in this patent.

It is a basic object of the present invention to provide an improved apparatus for use in composting organic material.

It is an object of the present invention to provide a compost bin that is inexpensive, lightweight, easy to assemble and disassemble, weather resistant, aestheically pleasing, and that will provide a good composting environment. Canadian Patent 986,896 to Jerpbak, discloses a Device and Method for Facilitating the Filling of Flexible Trash Bags. The device disclosed is formed from a rectangular sheet of material, preferably plastic, and is curved into a cylindrical shape. The device is then placed into a garbage bag and acts as as distender such that the garbage bag is held open. Once the garbarge bag is filled to the level of the top of the distender, the distender is raised up on the garbage bag. The lower part of the garbage bag is supported by the contained refuse, not by the distender.

SUMMARY OF THE INVENTION

The present invention provides a compost bin that is proper size for holding an ideal amount of compost—a volume of about one cubic meter, or a bit less. It is also easily adjustable in size such that smaller bins may be realized if necessary. This compost bin is made of sturdy plastic, is easier to assemble and disassemble and easy to move, it absorbs solar energy fairly readily, and is aesthetically pleasing. The compost bin of the present invention has a lid that protects the compost from foul weather, yet it is easily removable for accessing the compost. The shell also has a high percentage solid area all around, while maintaining a sufficient number of properly spaced perforations that allows for proper aeration and subsequent oxidation of the compost material. The holes are also used for purposes of receiving hardware that secures the assembled bin together.

It is perferable that the bin be virtually circular and that is a substantially continous piece of material. This allows the stress caused by the weight of the compost, which may reach several hundred pounds, to be absorbed by the material, in the form of hoop stress.

Also very important is the fact that the body of the unit can be wrapped around the lid, for purposes of storing, shipping, or generally transporting.

The unit is vey easy to assemble and install and requires no tools. Indeed, the fasteners used to assemble the bin are quite large which precludes them from being lost in the outdoors.

BRIEF DESCRIPTION OF THE DRAWINGS

Embodiments of this invention will now be described by way of example in association with the accompanying drawings, in which:

FIG. 4 is a side view from the inside of the compost bin, of the area shown in FIG. 3;

FIG. 5 is a cut away view of the part shown in FIG. 4.

FIG. 6 shows the compost bin ready for shipping;

DETAILED DESCRIPTION OF THE PREFERRED EMBODIMENTS

Figure 1:
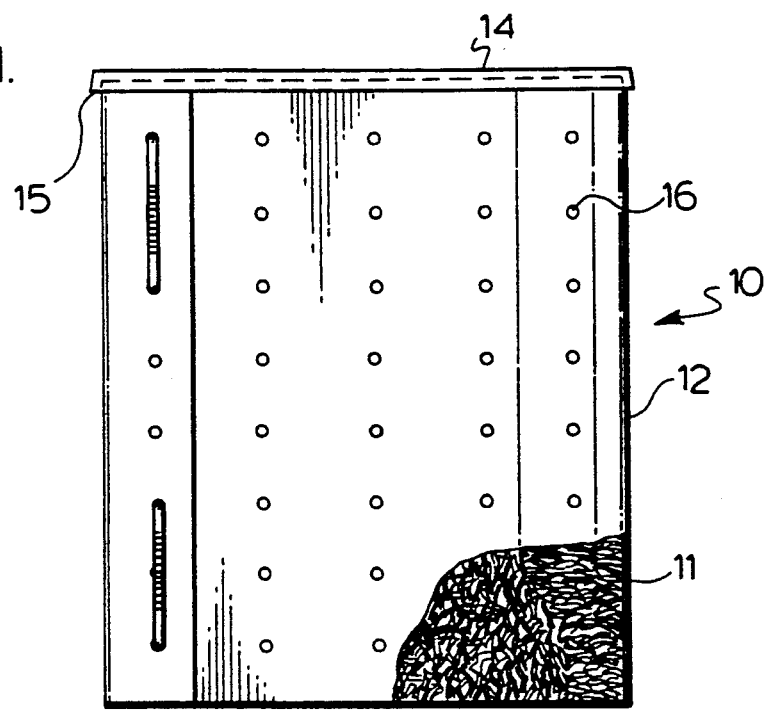
FIG. 1 is a partially cut away view of the compost bin in use, containing an amount of compost.

Reference will now be made in FIG. 1 which shows the compost bin 10, containing compost 11, comprising a shell member 12 and lid 14 placed on the top of shell member 12. Lid 14 has a lip 15 around its parameter, with lip 15 being adapted to receive and retain shell member 12. The lip 15 is angled outwardly such that the lids are nestable for storage and shipping of large quantities.

Figure 7:
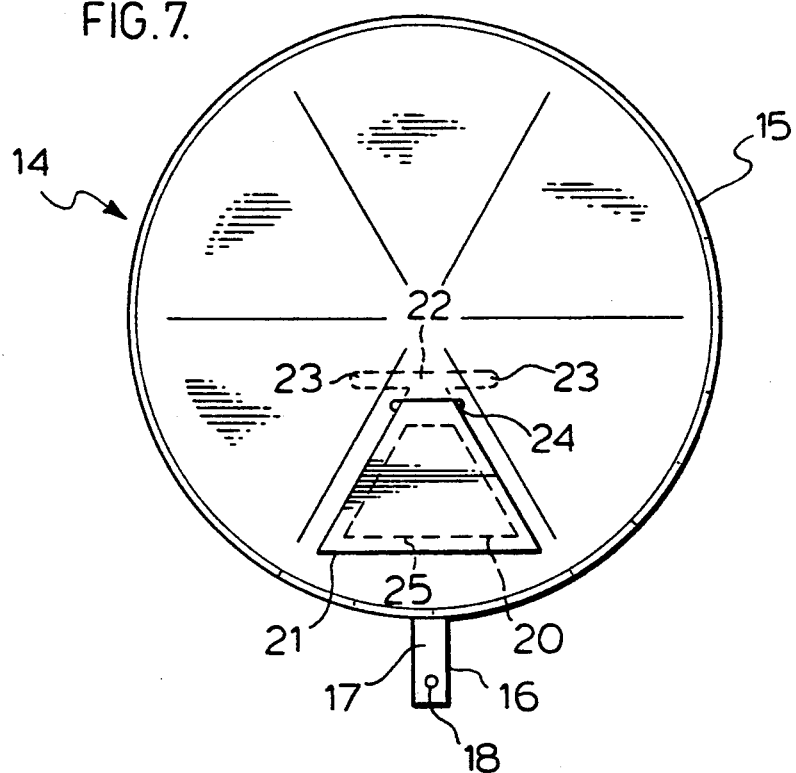
FIG. 7 is a top view of the lid.

The lid 14, as best seen in FIG. 7, has an integral tether 16 depending from lip 15. The tether 16 comprises a body portion 17 with an aperture 18 therein, preferably near the end of the body portion 17. There is an opening 20 in the top of lid 14 that can be used for depositing smaller pieces of material, rather than lifting the lid 14 off. Opening 20 is covered by flap 21 which has an integral tether 22 having a pair of protrusions 23. The protrusions 23 of tether 22 are inserted into a slot 24 in the lid 14. The outer end 25 of the flap 21 is preferably removably fastened to the lid by a fastening means such as VELCRO (Trade Mark).

Lid 14 and shell member 12 are in intimate contact such that moisture is precluded from travelling between them. Lid 14 helps to hold shell member 12 in a circular shape especially when the bin is being initially set up. This circular shape is highly desirable because it allows the shell member 12 to absorb the outwardly directed forces generated by the weight of the compost, in the form of hoop stress. The shell member 12 is a single sheet of high density plastic (best seen in FIG. 2) that is bent into roughly a circular shape when assembling the compost bin 10 and is held in geneally a circular shape when shell member 12 is introduced into intimate contact with lid 14. The method by which the compost bin is assembled will be described subsequently.

When assembled, the storage bin 10 is found to be quite sturdy because the shell member 12 is made from a single piece of plastic material and because it is substantially circular in cross section.

Shell member 12 contains a plurality of generally regularly spaced holes or perforations 26 that are there for the purpose of allowing oxygen to pass through the shell member 12. Such oxygen passage allows for proper oxidation of the composting material. The holes 26 account for only a fairly small percentage of the overall area of the shell member 12, preferably in the order of about 5% to 10%. It is necessary that shell member 12 be a high percentage of solid area so as to keep the composting material sheltered from the environment thereby allowing for proper moisture control. A high percentage of solid area also helps to substantially hide the compost from view.

Figure 2:
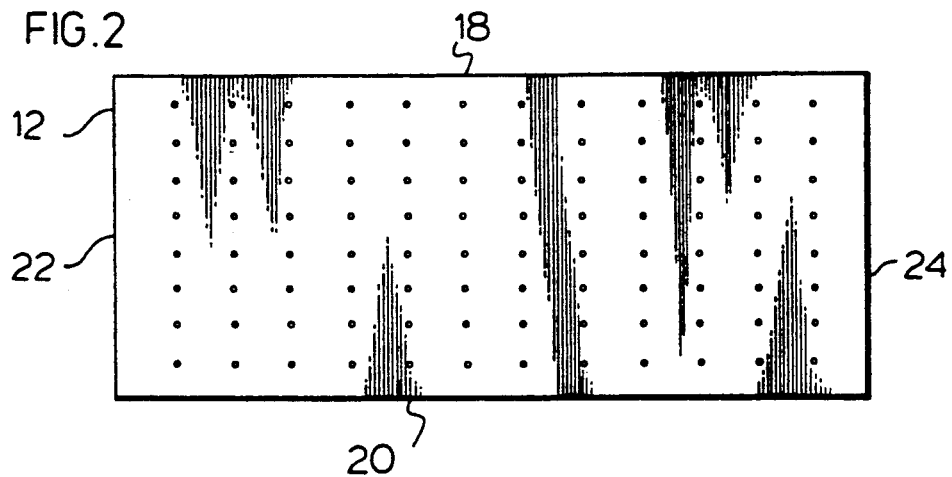
FIG. 2 is a front view of the sheet of material that comprises the body of the compost bin in its uncurved form.

Reference will now be made to FIG. 2 which shows the shell member 12 in its original form, before it is curved into a circular shape. It has a top edge 27, a bottom edge 28, a first side edge 29 and second side edge 30. The material preferably used is a high density polyethylene plastic, which is a fairly tough material and therefore is excellent for retaining the compost. Furthermore, polyethylene is fairly light in weight, which allows the storage bin to more easily shipped, more easily set up, and more easily moved around. Using a material such as high density polyethylene is also advantageous in that it is easy to make the shell such that it has the desired percentage of solid area. This is important because the compost should not have an excess of air flow therethrough. Excessive air flow would tend to cause too much moisture to be evaporated. It is important that sufficient moisture and heat be retained within the compost to allow for proper composting.

In terms of choosing materials, polyethylene is preferable because it easily bendable with no gross elastic memory—that is to say that there is no permanent deformation that affects operation when set up. Furthermore, polyethylene is available in a dark neutral colour, such as black, which is preferred in order to help absorb solar energy and also to make the unit less visible in an outdoor environment.

If black polyethylene is used, then it is possible to cut material costs since reground material can be used in the manufacture thereof.

Figure 3:
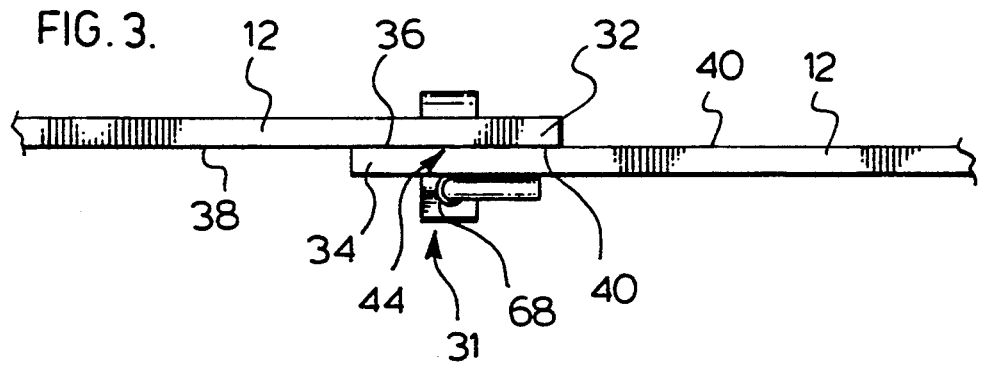
FIG. 3 is a top cut away view of the part of the compost bin where the two ends overlap.

Reference is now made to FIGS. 3, 4 and 5 which show closure means 31 in place and closing first end 32 and second end 34 such that they are generally in contact with each other, thereby closing the shell member 12 into its assembled form. First end 32 is preferably on the outside of second end 34. First portion 36 of first opposed surface 38 is generally in contact with first portion 40 of second opposed surface 42. The area where first portion 36 of the first opposed surface 38 and the first part 40 of the second opposed surface 42 are generally in contact with one another, with this area being the overlapping portion 44. The extent of the overlap will be determined by the size of the bin 10 that is formed by a given size of shell member 12. In the overlapping portion 44 there are two thicknesses of the shell member 12, and as can be best seen in FIG. 5, first perforation 50 and second perforation 52 are generally aligned with one another, thereby allowing the first arm 54 of closure strap 56 to the inserted therethrough. Correspondingly, second arm 58 or closure strap 56 in inserted through another generally aligned pair of perforations 60 and 62. Obviously, the length of closure strap 56 substantially equals the center-to-center vertical distance between pairs of holes 26 in shell member 12. The holes used need not be vertically adjacent, and are indeed preferably spaced apart by about 3 to 5 holes. The width of the first and second arms 54, 58 of closure strap 56 is just slightly less than the diameter of the perforations of shell member 12, this causing the closure strap 56 to fit almost snugly within the perforations, with very little lateral movement possible.

In order to retain closure strap 56 therein, a closure rod 66 is used. As can best be seen in FIG. 3, first arm 54 and second arm 58 are adapted to receive and retain closure rod 66 by way of apertures 68 and 70. The closure rod 66 is an elongated 'L' shape, and comprises two portions—elongated shaft 72 and stop means 74. The elongated shaft 72 is longer than the height of closure strap 56, thus allowing it to fit through apertures 68 and 70 located in arms 54 and 58 respectively. Stop means 74 precludes the closure rod 66 from falling though the closing strap 56. Stop means 74 is also used as a handle for removing and inserting the closure rod 66. Preferably, closure rod 66 is about the same height as compost bin 10. This allows the closure rod 66 to be inserted through a plurality of closure straps 56, the preferred embodiment using two, that are placed in line along the height of storage bin 10. Using such a size of closure rod also provides rigidity to the structure.

Closure strap 56 and closure rod 66 are preferably made of metal, such as galvanized steel, so that they are inexpensive, yet rugged, and corrosion resistant.

It is preferred that of closure means 31 be used to close the shell member 12 into its assembled form, with one of the closure straps 56 being at or near the top of shell member 12 and the other closure strap being near the bottom of shell member 12. This allows the shell member 12 to be properly closed along the entire length of the overlapping portion 44.

The closure means 31 is very important to the invention in that it is the preferred means to use to keep shell member 12 closed. It is indeed possible to close the overlapping portion 44 of shell member 12 with more common means such as a bolt, washer and nut configuration. It is, however, not desirable to use these types of commonly available fasteners because closure means 31 is much easier to use, is easily placed and removed, requires no tools to replace or remove, can be replaced or removed any number of times. Furthermore, the closure straps 56 and the closure rod 66 are both fairly large thus making it fairly easy to use closure means 31 and also precludes the closure straps 56 and closure rod 66 from being lost out of doors.

Reference will now be made to FIG. 6, in which another unique feature of storage bin 10 is shown. Storage bin 10 can be combined with the lid 10 and the closure means 31 to form its own package, suitable for storing and shipping. In order to form such package the lid 14 is wrapped inside shell member 12, which being made of high density polyethylene plastic is fairly flexible. Once the shell member 12 is wrapped properly around the lid 14, each closure strap 56 is then inserted into two pairs of generally aligned perforations, in the same manner as described above, during assembly of the unit. The closure rod 66 is then inserted through the apertures in the closure straps and can be held therein by a common hold down means such as packing tape.

In the above described manner, the parts of the storage bin are held snugly together and can be stored or even shipped. A great advantage to shipping the storage bin in such manner is that there are virtually no wasted materials used for shipping purposes, such as cardboard containers or the like. The only parts not used after shipping would be the adhesive tape used to keep the closure rod within the closure strap and any packing slip or mailing label included therewith. In order to disassemble the storage bin from its storage or shipping configuration, it is necessary to merely remove the closure rod 66 from the closure straps 56 and then remove the closure straps 56 from the shell member 10. Such disassembly is quite simple and can be done quite quickly.

In order to set up the storage bin 10, the preferred method is to first place shell member 12 on the ground such that the bottom edge 28 is in contact therewith. The shell member 12 is shaped as close as reasonably possible to circular but having a overlapping portion 44. The amount of overlap will depend on the size of bin that is to be formed. It is possible to make almost any size bin, down to a functional minimum of about one foot in diameter. Such overlapping portion 44 allows closure means 31 to be used to secure compost bin 10 together and to secure lid 14 thereto via tether 16. In order to do this, one arm of closure strap 56 is first inserted through aperture 18 in tether 16, and then inserted through the pair of first and second perforations 50, 52, which are at or near the top of compost bin 10. In such a manner, the lid 14 is secured to the compost bin 10, yet is still easy to lift the lid off to gain access to the bin. The other arm 56 is then inserted through the perforations 60, 62, which are vertically displaced from perforations 50, 52. Another closure strap 56 is then inserted through appropriate perforations at or near the bottom of compost bin 10. Closure rod 66 is then inserted through the apertures in the two closure straps, and is pushed down into the ground slightly until stop means 74 of closure rod 66 abuts against the arm 54 of the top closure strap 56. It is preferable to use one long closure rod inserted through two clsoure straps instead of one closure rod in each closure strap because the area around the bottom closure strap is typically covered with compost.

If a bin of maximum size is to be formed, then the perforations 50, 52 and 60, 62 that are lined up with one another are located closest to the end of both the first side edge 29 and the second side edge 30. If a smaller bin is to be formed then the perforations 50 and 60 that are located closest to the first end 32 are used if first end 32 is on the outside of second and 34. The holes 52 and 62 can be anywhere along the shell number 12, depending on the size of bin that is desired. The closure means are inserted in these holes so that the first entity tube does not tend to stick outwardly, since the plastic material might tend to straighten if no secured in a circular shape. Correspondingly, second and 34 might also tend to straighten what will be precluded from doing so by a portion of shell number 12 that it is in contact with.

It is believed that the functional minimum limit to the size of the bin is about one foot in diameter. At this size, the bin is three shell numbers thick and the holes will tend not to line up properly, thus precluding the closure strap 56 from being inserted.

Lid 14 can now be placed on top of the compost bin 10 such that the lip 15 of lid 14 retains the shell member 12 in a substantially circular shape. When in place, the lid 14 precludes closure rod 66 from being removed from the closure straps 56. It has been found that if the shell member 12 has been either flattened out or shaped for packing, it takes only a few minutes for it to reshape itself to be close to circular. Such assembly is obviously quite quick and easy. Different sizes of lids may be used to fit different sizes of bins.

The bin can be disassembled just as easily as it can be set up by following the reverse procedure as described above. This is often necessary in order to mix the compost around even more than if it remains in the bin and also to remove compost from the bottom of the bin.

Figure 8:
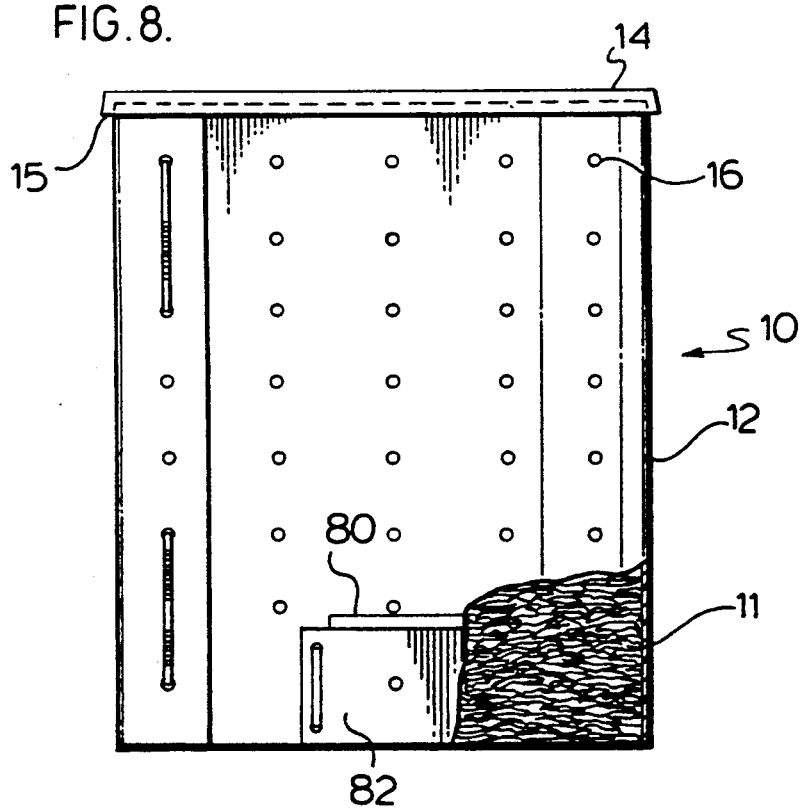
FIG. 8 is a view similar to FIG. 1 but showing an alternative embodiment.

Reference is no made to FIG. 8, which shows the cell number 12 of storage bin 10 with an opening 80 cut therein. The opening 80 is located at the bottom of shell number 12 approximately midway between the first end 32 and the second end 34. Placing the opening 80 midway between first end 32 and second end 34 allows for a minimum size of bin to be formed without the opening 80 being obstructed by either a first end 32 or a second end 34. The opening 80 can be cut fairly ready in the plastic material and is easily done by cutting between holes 26. Preferably the size of this opening is a foot or so wide by just under a foot high. The exact size of the opening is not critical. It must be of sufficient size to enable the removal of a small amount of older compost from the bottom of the compost contained within the compost bin 10.

In order to cover the opening 80, door 82 is placed on the outside of storage bin 10 and is out in place thereon by a pair of further closure means 84. Each further closure means 84 is similar to the closure means used to secure the compost bin 10 and comprises a closure strap 86 and is inserted through hole 26 and shell number 12 and also holes 90 in door 82, and also enclosure rod 88. It is necessary to insert the closure strap 86 from the inside of the compost bin 10 so that the closure rods 88 may be accessed. Closure rods 88 extend into the ground by a couple of inches, thereby helping to anchor the storage bin 10 along with longer closure rod 66.

The door 82 is obviously somewhat larger than the opening 80, by about three inches or so on each side and reminiscing amount at the top and bottom. The door 82 may also have holes in it for ventilation purposes.

In an alternative embodiment, a bin very similar to the bin described herein is contemplated, except that there are no holes in the bin for the purpose of ventilation, only holes to be used to receive and retain herein described closure means. Such a bin could be used to receive and retain many different types of things for storage. One such contemplated use is as a grain storer on a farm or ranch.

Other modifications and alterations may be used in the design and manufacture of the storage bin of the present invention without departing from the spirit and scope of the accompanying claims.

What is claimed is:

1. An assembled storage bin for containing compost, plant matter, refuse and the like, comprising:
    a shell member having a first end, a second end, a top edge, a bottom edge, a first side edge at said first end, a second side edge at said second end, first and second opposed surfaces, with said shell member shaped in a substantially curved configuration such that said first end overlaps said second end with said shell member thus forming into a generally cylindrical shape with an overlapping portion;
    wherein, within said overlapping portion, a first part of said first opposed surface is in contact with a first part of said second opposed surface;
    closure means comprising two closure straps and one closure rod, for keeping said contacting first parts of said first and second opposed surfaces at said overlapping portion generally in contact with one another thus keeping said storage bin closed; wherein said closure means is easily attachable and removable and wherein said closure means keeps said storage bin closed generally along the entire height thereof;
    said shell member having a plurality of perforations therein for the purpose of providing ventilation for said storage bin thus allowing a source of oxygen for oxidation and for receiving said closure means;
    said perforations also providing means for applying said closure means to said shell member;
    a removable lid adapted to fit over said bin and to be in contact with said top edge of said shell member; and
    wherein said storage bin is adapted to sit on the ground and is open at the bottom such that anything contained therein is in contact with or is supported by the ground.

2. An assembled storage bin for containing compost, plant matter, refuse and the like, comprising:
    a shell member having a first end, a second end, a top edge, a bottom edge, a first side edge at said first end, a second side edge at said second end, first and second opposed surfaces, with said shell member shaped in a substantially curved configuration such that said first end overlaps said second end with said shell member thus forming into a generally cylindrical shape with an overlapping portion;
    wherein, within said overlapping portion, a first part of said first opposed surface is in contact with a first part of said second opposed surface;
    at least one closure means for keeping said contacting first parts of said first and second opposed surfaces at said overlapping portion generally in contact with one another thus keeping said storage bin closed, wherein said closure means is easily attachable and removable and wherein said closure means keeps said storage bin closed generally along the entire height thereof;
    said shell member having a plurality of perforations therein for the purpose of providing ventilation for said storage bin thus allowing a source of oxygen for oxidation and for receiving said closure means;
    said closure means comprising a U-shaped closure strap and a co-operating closure rod, said closure strap having a first arm and a second arm adapted to each fit through two generally aligned perforations in said overlapping portion of said shell member, with said arms adapted to receive and retain said co-operating closure rod;
    said perforations also providing means for applying said closure means to said shell member;
    a removable lid adapted to fit over said bin and to be in contact with said top edge of said shell member; and
    wherein said storage bin is adapted to sit on the ground and is open at the bottom such that anything contained therein is in contact with or is supported by the ground.

3. The storage bin of claim 2, wherein said closure means comprises two closure straps and one closure rod.

4. The storage bin of claim 1, wherein said storage bin is adapted to receive and retain compost.

5. The storage bin of claim 1, wherein said storage bin is of a suitable size to allow for said retained compost to be worked.

6. The storage bin of claim 1, wherein said removable lid is connected to said shell member by a tether.

7. The storage bin of claim 1, wherein said removable lid includes a flap therein for accessing the contents of said storage bin without removing said lid from the top of said storage bin.

8. The storage bin of claim 7, wherein said flap is connected to said removable lid by a tether.

9. The storage bin of claim 1, wherein said shell member is of a high density polyethylene.

10. The storage bin of claim 1, wherein said shell member is of a colour such that it readily absorbs solar energy.

11. The storage bin of claim 1, wherein said shell member includes an opening near the bottom edge for the purpose of accessing the interior of said bin at the bottom area, and also includes a door to cover said opening.

12. The storage bin of claim 11, wherein said door is removably fastened to said shell member.

13. The storage bin of claim 11, wherein said door is removably fastened to said shell member by a further closure means, said further closure means comprising a closure strap and a closure rod.

14. A storage bin for containing compost, plant matter, refuse and the like, comprising:
 a shell member having a first end, a second end, a top edge, a bottom edge, a first side edge at said first end, a second side edge at said second end, first and second opposed surfaces;
 at least one closure means for keeping said contacting first parts of said first and second opposed surfaces generally in contact with one another when assembled thus keeping said storage bin closed, wherein said closure means is easily attachable and removable and wherein said closure means keeps said storage bin closed generally along the entire height thereof;
 said shell member having a plurality of perforations therein for the purpose of providing ventilation for said storage bin thus allowing a source of oxygen for oxidation and for receiving said closure means;
 said closure means comprising a U-shaped closure strap and a co-operating closure rod, said closure strap having a first arm and a second arm adapted to each fit through two generally aligned perforations in said shell member, with said arms adapted to receive and retain said co-operating closure rod;
 said perforations also providing means for applying said closure means to said shell member;
 a removable lid adapted to fit over said bin and to be in contact with said top edge of said shell member; and
 wherein said storage bin is adapted to sit on the ground and is open at the bottom.

15. An assembled storage bin, comprising:
 a shell member having a first end, a second end, a top edge, a bottom edge, a first edge at said first end, a second side edge at said second end, first and second opposed surfaces, with said shell member shaped in a substantially curved configuration such that said first end overlaps said second end with said shell member thus forming into a generally cylindrical shape with an overlapping portion;
 wherein, within said overlapping portion, a first part of said first opposed surface is in contact with a first part of said second opposed surface;
 at least one closure means for keeping said contacting first parts of said first and second opposed surfaces at said overlapping portion generally in contact with one another thus keeping said storage bin closed, wherein said closure means is easily attachable and removable and wherein said closure means keeps said storage bin closed generally along the entire height thereof;
 said shell member having a plurality of perforations therein for the purpose of receiving said closure means;
 said closure means comprising a U-shaped closure strap and a co-operating closure rod, said closure strap having a first arm and a second arm adapted to each fit through two generally aligned perforations in said overlapping portion of said shell member, with said arms adapted to receive and retain said co-operating closure rod;
 said perforations also providing means for applying said closure means to said shell member;
 a removable lid adapted to fit over said bin and to be in contact with said top edge of said shell member; and
 wherein said storage bin is adapted to sit on the ground and is open at the bottom such that anything contained therein is in contact with or is supported by the ground.

16. The storage bin of claim 14, wherein said removable lid is contained within said shell member and said closure means is used to secure said shell member securely therearound, for storage or transportation purposes.

17. The storage bin of claim 14, wherein said removable lid is connected to said shell member by a tether.

18. The storage bin of claim 17, wherein said tether is fastened to said storage bin by said closure means.

* * * * *